United States Patent [19]
Pretsch, Jr.

[11] Patent Number: 5,655,474
[45] Date of Patent: Aug. 12, 1997

[54] POSITION INDICATOR AND DISTANCE GAUGE

[76] Inventor: Donald Charles Pretsch, Jr., 5237 Clifton St., Alexandria, Va. 22312

[21] Appl. No.: 376,892

[22] Filed: Jan. 20, 1995

[51] Int. Cl.[6] .................................................. B60Q 11/00
[52] U.S. Cl. ................................. 116/28 R; 116/283
[58] Field of Search ............................. 116/209, 28 R, 116/63 R, 173, 205; 33/264

[56] References Cited

U.S. PATENT DOCUMENTS

| | | |
|---|---|---|
| 1,981,188 | 11/1934 | Pavitt . |
| 2,731,934 | 1/1956 | Hausmann et al. . |
| 3,219,972 | 11/1965 | Williams . |
| 3,261,321 | 7/1966 | Mandl . |
| 3,279,133 | 10/1966 | De Korte . |
| 3,371,647 | 3/1968 | Shopbell . |
| 3,621,807 | 11/1971 | Kang . |
| 3,977,354 | 8/1976 | Mazurek ........................ 116/28 R |
| 4,036,165 | 7/1977 | Wood . |
| 4,070,645 | 1/1978 | Oreluk . |
| 4,101,868 | 7/1978 | Bubnich et al. . |
| 4,341,488 | 7/1982 | Ryan . |
| 4,343,567 | 8/1982 | Sarver et al. . |
| 4,433,636 | 2/1984 | Crouch . |
| 4,862,823 | 9/1989 | Hughes . |
| 4,873,509 | 10/1989 | Simi . |
| 4,965,571 | 10/1990 | Jones ........................ 116/28 R |
| 5,036,593 | 8/1991 | Collier . |
| 5,040,478 | 8/1991 | Hughes . |
| 5,114,149 | 5/1992 | Bailey . |
| 5,186,119 | 2/1993 | Hlavin . |
| 5,189,802 | 3/1993 | Bergfield . |
| 5,205,236 | 4/1993 | Hughes . |
| 5,207,175 | 5/1993 | Andonian . |
| 5,215,033 | 6/1993 | Gipp et al. . |
| 5,227,785 | 7/1993 | Gann et al. . |
| 5,230,296 | 7/1993 | Giltz et al. . |
| 5,231,392 | 7/1993 | Gust . |
| 5,507,245 | 4/1996 | Kennedy ........................ 116/28 R |

*Primary Examiner*—William A. Cuchlinski, Jr.
*Assistant Examiner*—Vagnola Khamvongsa
*Attorney, Agent, or Firm*—Kerkam, Stowell, Kondracki & Clarke, P.C.; John C. Kerins

[57] ABSTRACT

A position indicating and distance gauging device is provided for the purpose of preventing impact or collision of a vehicle or an object, such as a trash dumpster, carried by a vehicle with a wall or barrier, such as a dumpster enclosure. The device includes an indicator arm retained in a generally vertical orientation and biased away from the barrier or wall, and a bracket mounted to the wall or other structure at a height at which distance markings provided on an upper face of a flange portion of the device will be readily visible to a vehicle operator in a vehicle that is approaching the barrier. The indicator arm passes through a slot in the flange of the bracket, and will deflect in a substantially pivoting motion, upon force being applied against it by a vehicle or object, toward the barrier, being guided by the slot, with the motion of the arm providing the vehicle operator with a visual indication that the arm has been contacted, and the arm further serves as a pointer that will line up with the markings on the flange to provide a readout of the distance of the indicator arm, and thus the vehicle or object touching and pushing against the arm, from the barrier or wall.

11 Claims, 4 Drawing Sheets

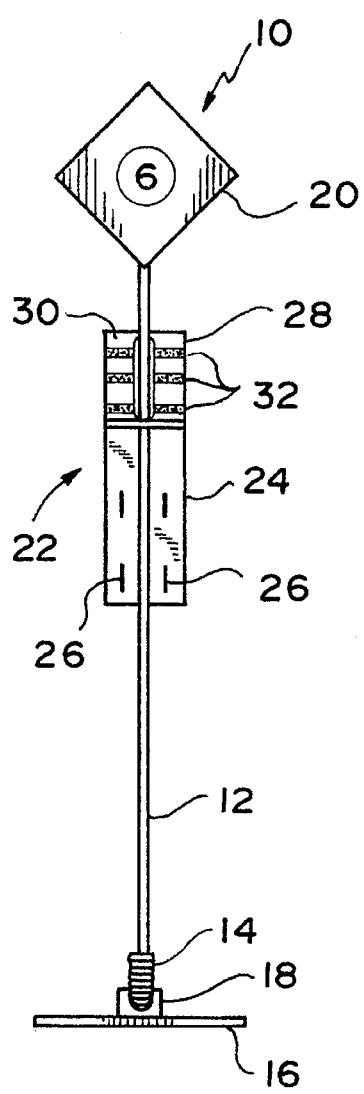
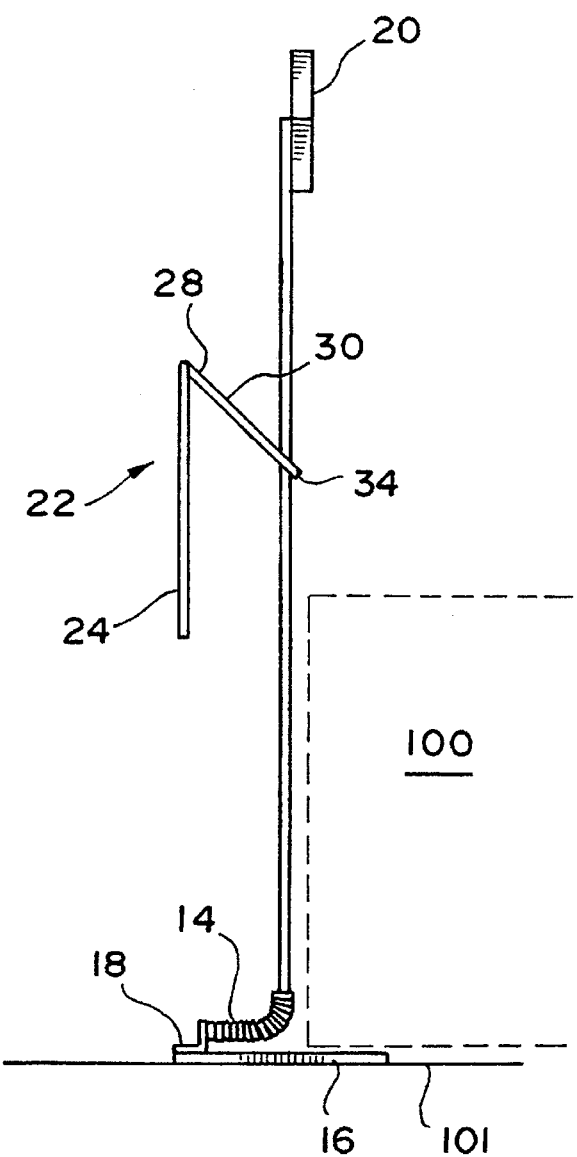
FIG. 1
FIG. 2

POSITION INDICATOR AND DISTANCE GAUGE

BACKGROUND OF THE INVENTION

1. Field of the Invention

The present invention relates to a device to aid in correctly positioning trash dumpsters within enclosures for the dumpsters, and to provide refuse truck drivers with a visual indication of the distance a dumpster is spaced from a wall of the enclosure. The present invention may also find use in aiding the positioning of vehicles in garages.

2. Description of Related Art

Various devices have been proposed in the art for use in assisting the driver of a vehicle in stopping his or her vehicle short of a back wall in a garage, with the object being that damage to the vehicle and to the wall will be avoided. Examples of such devices may be found in the following U.S. Pat. Nos. 1,981,188; 4,433,636; 5,231,392; 4,341,488; and 5,227,785.

In commercial parking garages, there is no substantial need to precisely position the vehicles at a specific distance away from the wall, as the parking spaces are fully open at the entrance end of each space. In residential garages, except in very rare instances, there is no need to ensure that a vehicle is spaced at a specific distance from the wall at the closed end of the garage. This is the case because, even though the vehicle must be pulled into the garage a sufficient distance to permit the garage door to be closed behind the vehicle, these garages are constructed in sufficient length to comfortably accommodate most makes and models of vehicles. The principal concern is avoiding inadvertent collisions of the vehicle with the wall of the enclosure. As a result, while the devices in the above-noted patents provide a visual (or audible) indicator that the vehicle is approaching a wall of an enclosure such as a garage, none of the devices provides the vehicle operator with a distance gauge for determining precisely how close the front of the vehicle is to the wall.

None of the above-noted patents are concerned with positioning trash dumpsters in the enclosures that are commonly provided to house the dumpsters in between the scheduled trash pickups. Dumpster enclosures are widely used for a number of reasons, including for aesthetic purposes when the dumpster would otherwise be in view at a business establishment, for security purposes (to deter vandalism or unauthorized use), and/or as a physical barrier to various pests that attempt to forage in the contents of the dumpster.

The space for storing a dumpster is, for economic reasons, nearly always quite limited, as the space, if completely outdoors, could be used for additional parking spaces, and if indoors (e.g., in an interior shipping or loading dock area), could be used in some sort of income-generating manner. The enclosures for the dumpsters are thus constructed to conform fairly closely to the peripheral dimensions of the dumpster, often allowing for one foot or less space between the side walls of the dumpster and the side walls of the enclosure, and between the rear extent of the dumpster and the rear wall of the enclosure.

The dumpster enclosures are generally of very sturdy construction, and brick or cinderblock masonry is a common material of construction. Sturdy barriers made of lumber materials are also relatively common. The fixed portion of the enclosure is generally constructed to enclose the back and the two sides of the dumpster, and a double gate is most commonly found at the front side of the enclosure. The dumpster is emptied, as is well known in the art, by a large refuse truck outfitted with hydraulically powered arms used to engage, lift, and tip the dumpster into an opening on the top of the refuse-containing compartment on the back of the truck. The arms normally extend from the front end of the cab at the front of the truck, so that, once engaged, the dumpster is carried in right in front of the driver.

As part of the dumpster emptying process, once the dumpster is engaged and lifted slightly from the ground, the truck will back up to remove the dumpster from the enclosure before fully lifting and then overturning or tipping the dumpster. The dumpster is then uprighted, lowered, and driven back into the enclosure.

The enclosure walls, even though sturdily constructed, are frequently damaged, and sometimes severely, in the process of emptying the dumpster and returning it back to the enclosure. The dumpster itself is of very sturdy construction, generally being fabricated of relatively thick steel plate welded into a container configuration, and the refuse trucks equipped with the dumpster-emptying equipment are large, heavy, and have comparably large power plants, in the form of diesel engines. That combination of features gives the truck advancing a now-empty dumpster a great deal of momentum as the dumpster is being returned to the enclosure.

The majority of the damage to dumpster enclosures is to the back wall of the enclosure, because, although somewhat difficult, the truck driver can use his own vantage point and rely on his perceptions to steer the truck so as to avoid contact between the dumpster and the side walls of the enclosure. However, the distance between the back wall of the enclosure and the dumpster being returned to the enclosure is very difficult for the truck driver to judge, as the dumpster extends out a considerable distance from the front of the truck, and this effectively eliminates the ability of the truck driver to rely on his perception of distance. In some instances, the height at which the dumpster must be carried by the truck will completely obscure the back wall of the enclosure from the view of the truck driver, reducing the attempt to properly position the dumpster (in a front-to-back sense) to a guessing game.

While damage to the rear wall of the enclosure might be spared, it is impractical from a worker productivity standpoint to have the truck drivers incrementally advance the dumpster, lower and release it, and then exit the truck to see if the dumpster is sufficiently within the enclosure such that the front gate portion of the enclosure can be closed without interference from the dumpster. Thus, there is a need in the art for a device that will allow a truck driver to determine, as the dumpster is being advanced into the enclosure, the distance between the dumpster and the rear wall of the enclosure, once the two begin coming close to one another.

It is nonetheless important, from an economic standpoint, to prevent damage to the walls of a dumpster enclosure. Despite the sturdy construction, the enclosures can be severely damaged through impact with the dumpster. Further, because such a sturdy construction is required, repairing the damage is very costly, as expensive masonry work is often required, and the repair materials are expensive as well.

In general, the prior art position indicators proposed for use in garages and for personal vehicles provide only a signal, either audible or visual or both, upon contact of the vehicle with a pole or other contact device. Because of the considerable amount of momentum involved with the advancing truck/dumpster combination, and the need to fairly precisely position the dumpster relative to the rear wall, such devices, if somehow adapted to be positioned in a dumpster enclosure, would still lack the ability to inform the truck driver of the distance between the dumpster and the rear wall of the enclosure as the dumpster is being advanced into the enclosure.

It is therefore a principal object of the present invention to provide a device that will function as a position indicator and distance gauge for use especially in dumpster enclosures to aid truck drivers in properly positioning dumpsters within the enclosures.

It is a further important object of the present invention to provide a device that will provide a truck driver with ample advance warning of the decreasing distance between an enclosure wall and a dumpster being positioned in the enclosure, so that the momentum of the truck can be decreased and stopped prior to any collision between the dumpster and the enclosure wall.

It is an additional important object of the present invention to provide a position indicating and distance gauging device that is readily adaptable for effective use with enclosures of different sizes and constructions.

It is a further important object of the present invention to provide a position indicating and distance gauging device that is within the clear line of view of the vehicle driver, thereby enabling the driver to accurately gauge a spacing distance from an enclosure wall or other barrier, without needing to leave the vehicle.

SUMMARY OF THE INVENTION

The above and other objects of the present invention are achieved in the present invention by providing a position indicating and distance gauging device having a vertically extending am secured at a predetermined point along its length, and having a movable portion biased in a direction away from a wall or barrier from which a distance is to be gauged, and an arm restraining bracket having indicia appearing thereon that are representative of the spacing distance of the arm from the wall or barrier. The device further has a sign capable of bearing information disposed on the vertical arm at a position where the sign will be in view of a vehicle operator, and generally at the upper end of the vertical arm.

The bracket has an elongated slot therein through which the indicator arm extends. The bracket has, along the length of the slot, markings or other suitable indicia that provide distance information. The indicator arm itself, by extending through the slot, serves as the pointer for reading the distance markings or indicia. Once the device is installed at a particular location, the arm and bracket will give a visual indication of the distance of the indicator arm, and thus also of the dumpster pushing against the indicator arm, from the wall or barrier on which the bracket is mounted.

The device also employs a sign mounted on the indicator arm at a height within the field of view of a truck driver. The sign may be plain, and used simply to signal to the truck driver, by seeing the sign move, that contact has been made with the indicator arm. The sign may also carry information related to the distance at which the dumpster is to be positioned within the enclosure, or other information relevant to the safe and expeditious handling of the dumpster during the unloading process.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment taken in conjunction with the accompanying drawings wherein like reference characters represent like parts throughout the several views.

FIG. 1 is a front elevation view of the position indicator and distance gauge of the present invention.

FIG. 2 is a side view of the position indicator and distance gauge of the present invention.

DETAILED DESCRIPTION OF THE PREFERRED EMBODIMENT

Figure 3:
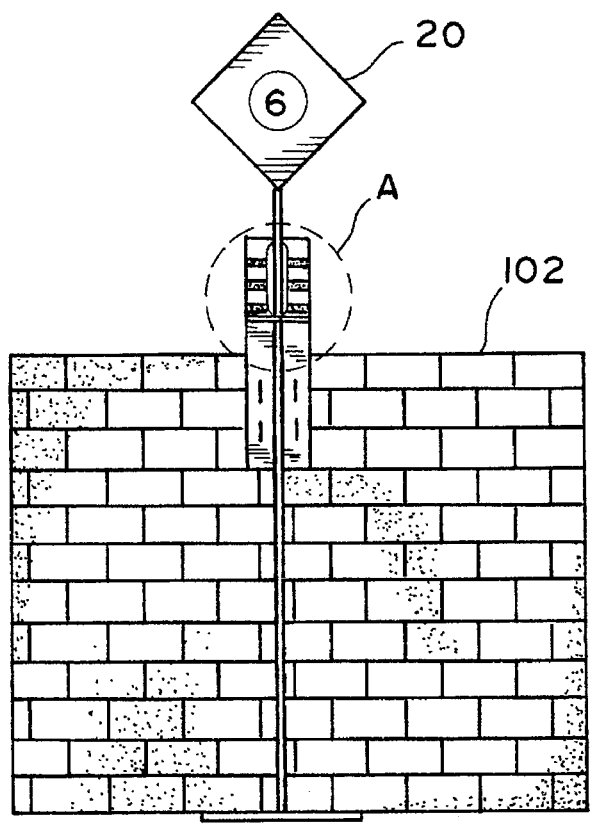
FIG. 3 is a front elevation view similar to FIG. 1, but with a schematic representation of a rear wall of a dumpster enclosure or other barrier.

Referring now initially to FIGS. 1–4, in a preferred embodiment of the present invention, the position indicator and distance gauging device 10 comprises two principal elements, an indicator arm 12 and a bracket 22. It should be noted that like reference numerals refer to like elements throughout the figures. Indicator arm 12 is secured in this preferred embodiment at a lower end thereof, by biasing means 14, shown in the figures as a coil spring 14.

The indicator arm 12 and coil spring 14 are preferably selected to be of similar size, such that the lower end of arm 12 can be inserted part way into the interior of spring 14 at one end thereof, and the spring will snugly engage the arm 12. The arm is further preferably welded to the spring in order to provide a secure and substantially permanent engagement between the two elements.

The arm 12 may be made from round steel rod stock, pipe stock, or flat bar stock, and in materials other than steel, the only requirement being that the arm 12 be substantially rigid and resistant to plastic deformation even after repeated impacts by trash dumpsters, vehicle bumpers, and the like. Biasing means other than a coil spring are also contemplated for use with the present invention. Other suitable biasing means would include, but not be limited to, heavy gauge rubber tubing, cantilever members of steel or other materials connected to the arm 12 in a manner permitting deflection of the arm, and substantially any other material capable of being secured to the arm 12 and mounted in a manner so as to urge or bias the arm in a desired direction, namely, in a direction extending away from a barrier desired to be protected.

At the end of coil spring 14 opposite the end to which indicator arm 12 is secured, the coil spring is preferably secured to a lower platform 16 that is adapted to be secured to a ground surface or floor element 101, generally made of concrete in dumpster enclosures. A section of angle iron or steel angle 18 is depicted in the preferred embodiment as having a vertically extending portion to which the end of coil spring 14 is attached. This attachment may preferably be made by weldment. A horizontally oriented portion of the angle member 18 is preferably welded or bolted to the horizontally disposed lower platform 16, which is larger in size than the angle member.

Figure 4:
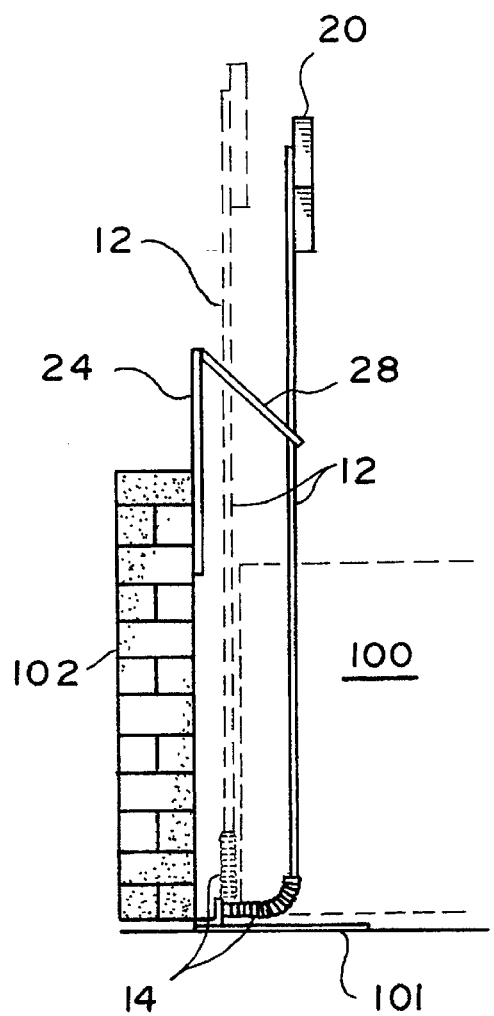
FIG. 4 is a side view similar to FIG. 2, but with a schematic representation of a rear wall of a dumpster enclosure or other barrier.

It can best be seen in FIGS. 2 and 4 that, by mounting the spring 14 to the angle member 18 in a horizontal orientation, and then moving indicator arm 12 to the preferred vertical orientation, the spring will bias the arm, urging the arm in a direction toward the horizontally oriented rest position of the spring (toward the right hand side of the drawing sheets).

Figure 5:
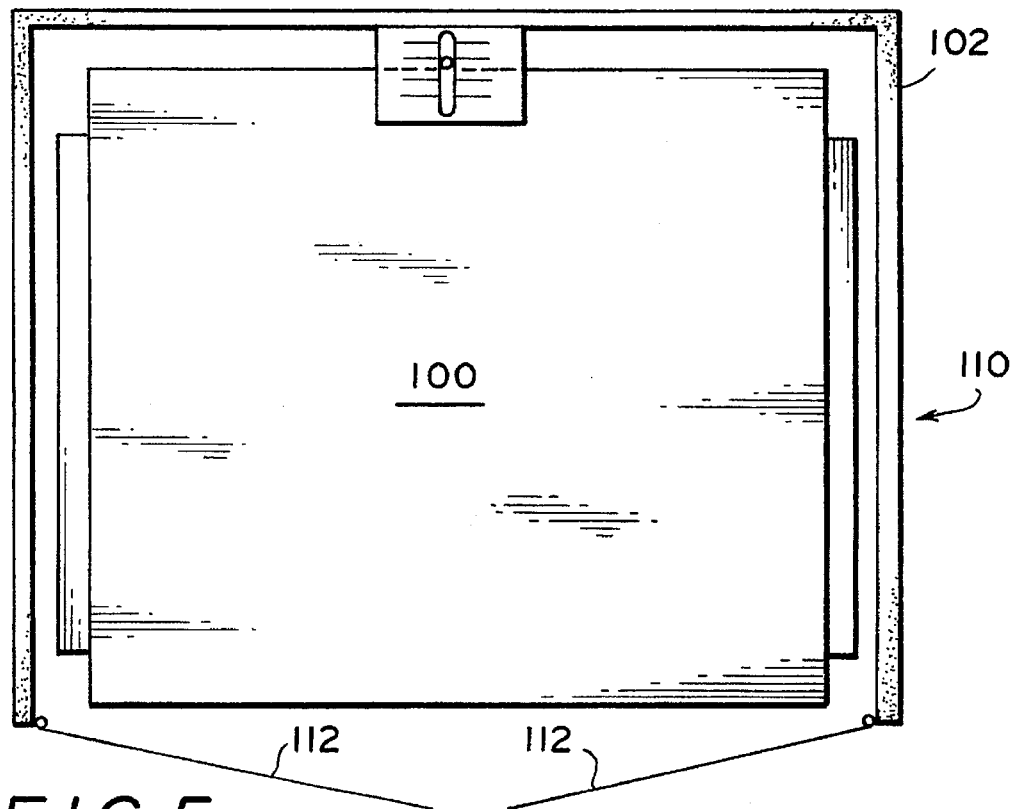
FIG. 5 is a substantially schematic top plan view of a dumpster situated within a dumpster enclosure in which the present invention has been installed.

The second principal component of the device of the present invention is bracket 22. The bracket 22 comprises a mounting portion 24 and a flange portion 28 extending at an angle away from the mounting portion. In this depicted preferred embodiment, the bracket is constructed to be mounted to the barrier, such as a rear wall of a dumpster enclosure (see FIG. 5), which is to be protected by the position indicating and distance gauging device. The bracket may be mounted by any conventional means 26 for securing items to the type of material from which the barrier is constructed. In the case of barriers made of brick or cinder block, masonry nails or screws would be suitable for use.

The flange portion of the bracket is preferably presented, once the device is installed at the desired location, at an angle such that the entire upper face 30 of the flange will be readily visible to a vehicle operator, such as a driver of a refuse truck, when the vehicle is facing and approaching the barrier. As depicted, the flange portion 28 will preferably form an acute angle with the mounting portion 24, on the order of 45 degrees, such that the upper face 30 will descend in height from the point nearest the mounting portion to the distal end 34 of the flange portion.

The flange portion 28 has a slot 36 disposed therein, extending from a point substantially adjacent said mounting portion to a point near the distal end 34 of the flange portion. The slot will be described herein as having a proximal end 38 nearest the mounting portion of the bracket, and a distal end 40 at the point farthest from the mounting portion (see FIGS. 6 and 7). When the device is installed, the arm 12 extends through the slot 36, and the movement or range of motion of the arm is thus restricted or restrained by the slot. The width of the slot is preferably slightly wider than an outer diameter, or other width dimension, of the indicator arm 12, in order to prevent any significant lateral movement of the arm. More importantly, the arm and the flange portion surrounding the slot need to be in close proximity in order to perform the function of distance gauging, as will be discussed in more detail later.

It can readily be seen that, after the device is installed, with the arm extending through the slot, the distal end 34 of the flange portion provides an abutment precluding the arm 12 from moving (rotating) toward the horizontal spring rest position. The dimensions of the components of the device, and their mounting positions and orientations will be selected such that, when installed, the indicator arm 12 will be oriented substantially vertically, and will be biased in a direction extending away from the barrier 102, but will be restrained and held in the vertical orientation by the distal end 34 of the flange portion 22. It is well within the level of skill in this art, after having viewed the figures herein and having read this description of the construction and intended function of the invention, to select appropriate part sizes and dimensions, and to mount the components at the appropriate positions in order to achieve the preferred construction and arm orientation.

The indicator arm 12 is preferably provided, at its upper end, with a sign 20 that will be clearly visible to the vehicle operator. The sign 20 functions to provide the first indication to the operator that contact has been made between the vehicle, or the object being moved at the front of the vehicle, and the indicator arm, in that movement and vibration of the sign caused by the contact will be readily seen by the operator.

As noted earlier in the specification, when the vehicle is a refuse truck attempting to return a dumpster to its proper location inside a dumpster enclosure 110 (FIG. 5), it is a difficult task to position the dumpster 100 close enough to the rear wall to enable the closing of the gates 112 constituting the front wall of the enclosure, while at the same time avoiding ramming the dumpster into the rear wall 102 of the enclosure. While it would be possible to position a single motion indicator, such as the sign 20 on the arm 12, at the proper spacing distance to signal the truck driver that he is "close enough", such a device is generally not totally satisfactory for this purpose. In such a device, the arm and sign would have to be placed at only a small spacing from the rear wall in order to provide the proper indication of position. However, it is very difficult for the driver to abruptly stop the forward motion of the truck upon seeing the motion of the sign, and collisions between the dumpster and the rear wall of the enclosure, while possibly reduced in number and magnitude of damage done, would invariably continue to occur.

The movement of the sign 20 in the device of the present invention in essence provides an "early warning" indication that the dumpster is nearly in its proper position inside the enclosure, and the spacing of the arm 12 from the wall 102 is selected and designed such that contact with the arm will be made at a spacing greater than the final desired spacing. Drivers will use the early warning indication to begin a further slowing down of the vehicle by reducing the throttle to the engine or by applying additional pressure on the brakes, as appropriate. Drivers will also be reminded by the early indication to focus their attention on the upper face 30 of the flange portion of the bracket that will then be in plain sight at or near eye level to the driver in the vehicle.

Figure 6:
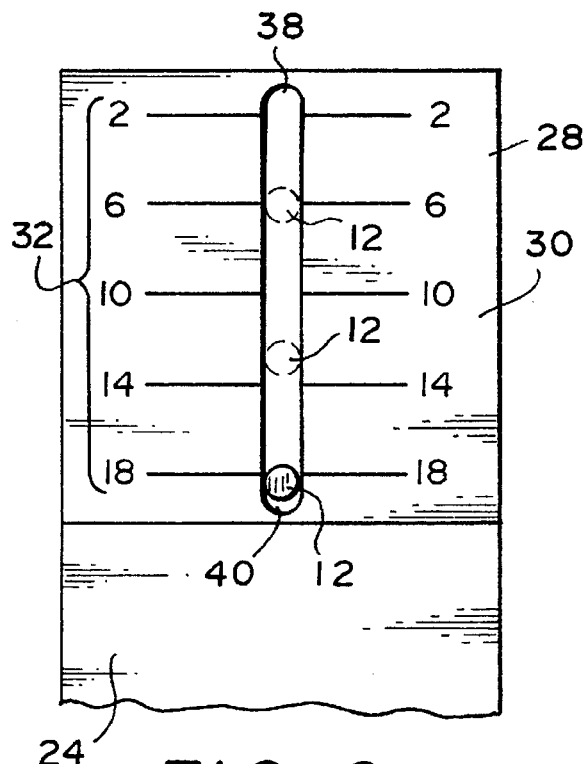
FIG. 6 is a plan view of the face of the bracket portion of the device of the present invention, as a blow up of item A in FIG. 4, showing a preferred embodiment of the markings disposed on the bracket.

As can best be seen in FIG. 6, the upper face 30 of the flange portion of the bracket will preferably be provided with indicia 32, such as a series of markings, along the length of the slot, which will be representative of instances from the wall or barrier on which the bracket is mounted. As can be seen in FIG. 6, for use in a dumpster enclosure, it will generally be desired to have the ability to begin gauging distances at a spacing of in the range of about eighteen (18) inches. That maximum gauging distance can vary depending upon the particular circumstances of use of the device, and thus the device could be sized and constructed to provide maximum gauging distances of twelve (12) inches, twenty-four (24) inches, or virtually any distance that would allow for safe stopping of the vehicle, taking into account nominal driver reaction times.

FIG. 4 shows, in broken lines, indicator arm 12 in a state of deflection, upon application of a pushing force by dumpster 100 which is being transported, in a manner well known in the art, by a refuse truck (not shown). It can be seen in that figure that arm 12 and spring 14 will be forced toward the rear wall 102 by dumpster 100, maintaining a substantially vertical orientation. The spring 14 will generally ride up the side of the dumpster, thereby raising slightly the arm 12, as seen in FIG. 6. As the dumpster approaches even more closely, the spring 14 will have sufficient flexibility to flip to one side or the other, allowing the dumpster to be placed extremely close to wall 102, if desired. The arm 12 is guided within slot 36 as it is pushed toward wall 102.

Referring to FIG. 4 in conjunction with FIG. 6, it can be seen that indicator arm 12 functions as a pointer to be used in reading a spacing distance from the markings 38 provided on the upper face 30 of the flange. The markings can be readily calibrated to take into account the motion pattern of the indicator arm such that the spacing distance is accurately reflected by sighting the markings flanking the indicator arm.

The indicia or markings need not necessarily be numerical distance markings, and any number of marking schemes could be used. For example, a word scheme advising that the spacing is "too far", "correct", and "too close" could be employed. A color scheme in which the distal end of the flange presents a green region, followed by a yellow region, and a red line, would be analogous to the meanings given to traffic signals. It is, however, presently believed that the numerical markings will provide a more universally installable device, in recognition of the fact that a spacing that might be correct in one enclosure may be too far from the rear wall in a different enclosure, for example. Using a numerical marking scheme, the driver is made aware, for each dumpster enclosure, what the acceptable spacing or range of spacing is. In a preferred embodiment, the sign 20 serves not only as the early warning indicator, but also will have a marking or markings 6 thereon (see FIGS. 1 and 3) corresponding to markings 32 found on the flange 28, advising the driver of the readings taken from the flange gauge that constitute acceptable spacings for the dumpster.

Figure 7:
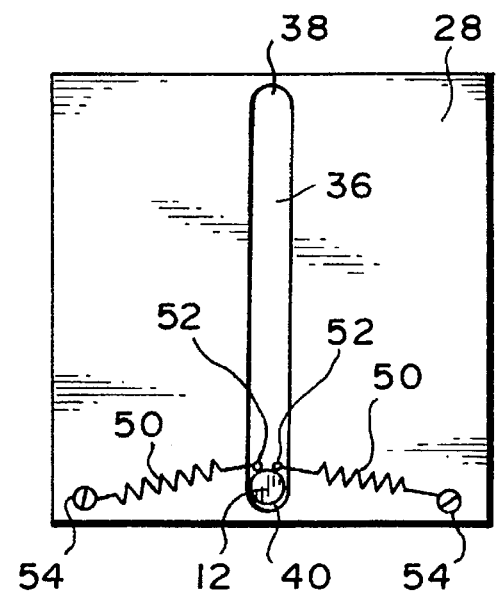
FIG. 7 is a view of the underside of the bracket portion showing the use of additional positioning springs in an alternate preferred embodiment of the present invention.

FIG. 7 depicts the underside of the flange portion 28 of bracket 22, showing a pair of optional springs 50 provided for the purpose of aiding in properly positioning and biasing the indicator arm 12 at the distal end 40 of slot 36 when there is no object in contact with the arm, or into intimate contact with the object once positioned in the enclosure. It is contemplated that coil spring 14 will provide sufficient biasing force to maintain the arm in proper position under most circumstances. However, it is possible, for example if the dumpster enclosure is located in an area that frequently experiences strong winds, additional biasing force may be desirable, as the sign 20 may provide enough wind resistance that the wind cycles will repeatedly cause the arm to be deflected away from the dumpster, and in a lull, have the arm bang back against the dumpster. Springs 50, or other suitable elastically elongating members, may be provided to alleviate this problem, which is seen more as a noise nuisance than as a deficiency that would affect proper operation of the device. The springs 50 can be secured to arm 12 by connection to eyes 52 spot welded to the arm, and secured to the underside of the flange 28 by screws 54 or other suitable fasteners.

Springs 50 perform the additional function of aiding in maintaining the vertical or perpendicular orientation of the arm 12 as the arm is forced toward the wall 102 by a dumpster or other object or vehicle. The springs 50 provide a biasing force at a second point, and thus will substantially prevent the arm 12 from merely pivoting about a "fulcrum" formed by the securing of the arm 12 to coil spring 14.

Figure 8:
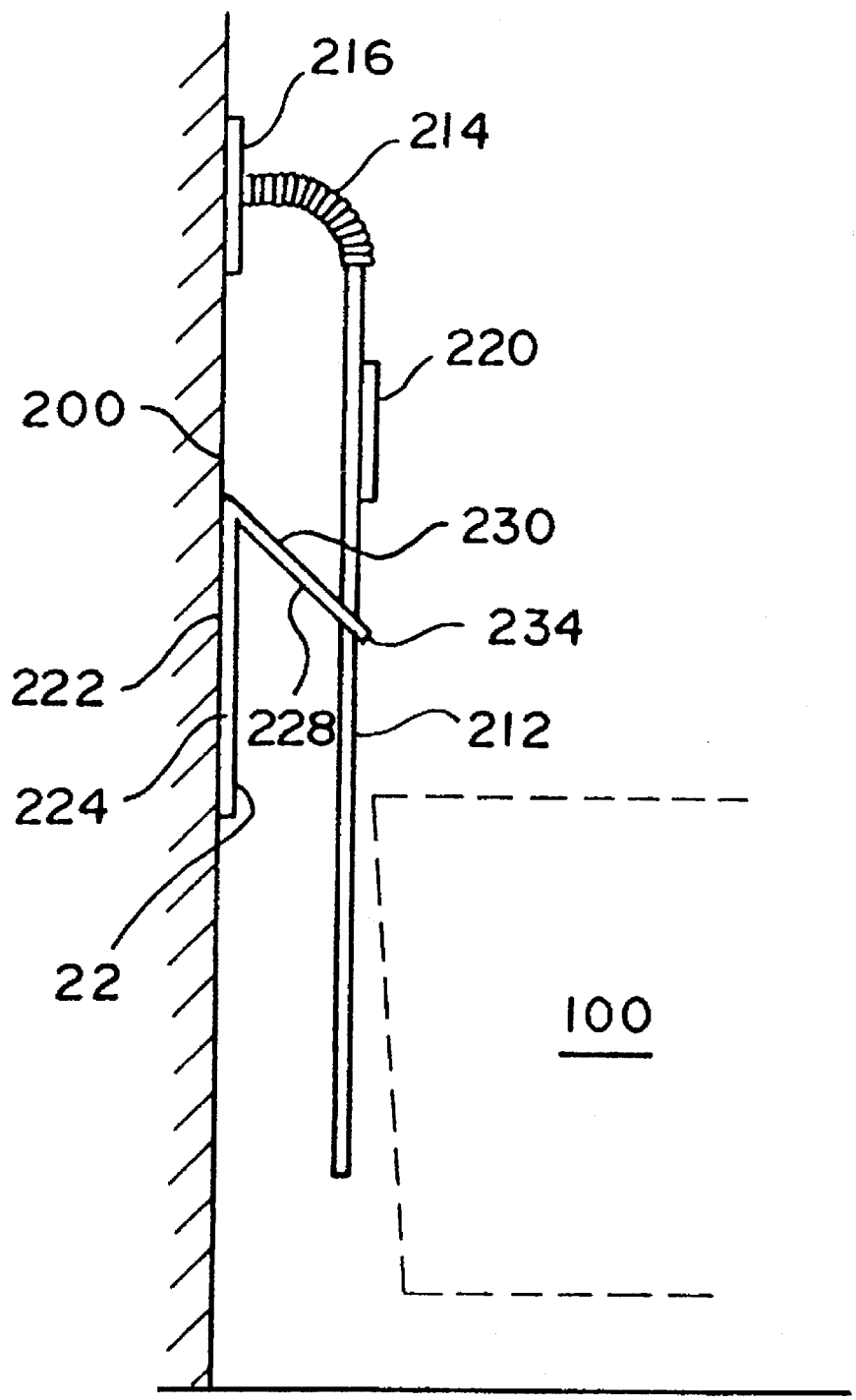
FIG. 8 is a side view of an alternative preferred embodiment of the device of the present invention.

FIG. 8 shows an alternative preferred embodiment of the present invention that may be suitable for use when securement of the lower end of indicator arm is not practical or desirable, and where the wall or barrier is of sufficient height to accommodate a top-secured indicator arm. Alternatively, this embodiment may be an attractive alternative when a ceiling is available and top mounting is preferred for whatever reason.

This FIG. 8 embodiment is in many ways constructed similarly to the foregoing embodiment. An indicator arm 212 is secured to a coil spring 214 or other biasing means at an upper end of the arm. The spring 214 is secured to platform 216, and the platform is secured to the wall 200, or to a ceiling (not shown). The rest position of the coil spring 214 is again a horizontal orientation, and thus, once arm 212 is coupled with bracket 222, extending through and being retained in slot 36, the arm is biased to a first position at the distal end 234 of the flange portion 228 of bracket 222. Bracket 222 is secured to the wall or barrier 200 by suitable attachment of the mounting portion 224 of the bracket to the wall. In fact, bracket 222 may preferably be of identical construction to bracket 22 under most circumstances.

The upper face 230 of the flange portion 228 is provided with suitable indicia or markings, which in conjunction with the pointing function of indicator arm 212, serve to allow the vehicle driver to take a reading of the spacing distance of the vehicle or object from the wall 200. The bracket is again positioned such that the markings will be readily visible to the driver in the vehicle approaching the wall. One other constructional variation in this embodiment is that sign 220 is not positioned on the arm at the end opposite the coil spring 214 securing the top end of the arm. Instead it is positioned intermediate the coil spring 214 and bracket 222, so that it too will be in plain view for the driver. The motion and vibration of the sign 220 in this embodiment may be more difficult to detect, as the sign will be more stably supported and will have less movement than the portion of the arm at the level of the bracket. By comparison, the sign in the previous embodiment is at the free end of the arm, and will move a greater distance than the portion of the arm at the level of the bracket, making motion much easier to detect.

It is to be understood that the foregoing description of the preferred embodiments of the present invention is for illustrative purposes, and many variations will become apparent to those of ordinary skill in the art upon reading this disclosure and viewing the figures forming a part of this disclosure. Such variations do not depart from the spirit and scope of the present invention and the scope of the invention is to be measured by reference to the appended claims.

What is claimed is:

1. A positioning and distance gauging device comprising;
    an indicator arm disposed in a substantially vertical orientation and biased in a direction corresponding to a first position at which the indicator arm is spaced apart from a barrier at a predetermined distance, said indicator arm being secured at a predetermined point along its length to substantially restrict movement of said indicator arm at said predetermined point;
    biasing means connected to said indicator arm for biasing said indicator arm toward said first position and for permitting movement of said arm in a direction of a second position closer to said barrier than said first position;
    a bracket having a mounting portion and a flange portion, said flange portion projecting away from said mounting portion and having a slot disposed therein and extending in a direction away from said mounting portion, said slot having a proximal end closest to said mounting portion and a distal end farthest from said mounting portion, an upper side of said flange portion having indicia thereon adjacent the slot, said indicia being representative of spacing distances from said barrier;

said indicator arm and said bracket being so constructed and arranged, once installed at a predetermined site of said barrier, such that said indicator arm extends through said slot in said flange portion of said bracket and is biased toward said first position at said distal end of the slot, wherein the portion of the arm extending through the slot is movable along the length of the slot, wherein a direction of movement of the indicator arm is restricted by said flange in which said slot is formed, wherein said bracket is secured at a predetermined height above ground level such that said flange portion will be in a field of view of a vehicle operator, and wherein said indicator arm is presented to a vehicle operator in said substantially vertical orientation.

2. A device as recited in claim 1 wherein said biasing means is disposed at a lower end of said indicator arm and is secured to said indicator arm at said lower end.

3. A device as recited in claim 2 wherein said biasing means comprises a coil spring secured at a first end to said indicator arm and secured at a second end opposite said first end to a vertically oriented member such that a rest position of said coil spring is in a horizontal orientation.

4. A device as recited in claim 3 wherein said vertically oriented member is an angle member having also a horizontally oriented member secured to a floor element.

5. A device as recited in claim 4 further comprising a lower platform, wherein said angle member is secured to said floor element by being secured to said lower platform, and said lower platform is secured to said floor element.

6. A device as recited in claim 2, further comprising a sign secured to said indicator arm at an upper extent of said indicator arm.

7. A device as recited in claim 6, wherein said sign has at least one marking thereon corresponding to an indicia appearing on said upper face of said flange portion of said bracket.

8. A device as recited in claim 1 wherein said biasing means comprises at least one spring secured to said indicator arm at substantially a height at which said flange portion of said bracket is disposed, and secured to said flange portion of said bracket.

9. A device as recited in claim 8 wherein said biasing means further comprises a coil spring disposed at a lower end of said indicator arm and is secured at a first end to said lower end of said indicator arm and secured at a second end opposite said first end to a vertically oriented member such that a rest position of said coil spring is in a horizontal orientation.

10. A device as recited in claim 1 wherein said biasing means is disposed at an upper end of said indicator arm and is secured to said indicator arm at said upper end.

11. A device as recited in claim 10 wherein said biasing means comprises a coil spring secured at a first end to said indicator arm and secured at a second end opposite said first end to a vertically oriented member such that a rest position of said coil spring is in a horizontal orientation.

* * * * *